(12) United States Patent
Haskell et al.

(10) Patent No.: US 10,148,970 B2
(45) Date of Patent: Dec. 4, 2018

(54) SCALABLE VIDEO CODING/MULTIPLEXING COMPATIBLE WITH NON-SCALABLE DECODERS

(71) Applicant: Apple Inc., Cupertino, CA (US)

(72) Inventors: Barin Geoffry Haskell, Mountain View, CA (US); David William Singer, San Francisco, CA (US); Thomas Pun, Hong Kong (CN); Hsi-Jung Wu, San Jose, CA (US); James Oliver Normile, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 514 days.

(21) Appl. No.: 14/599,285

(22) Filed: Jan. 16, 2015

(65) Prior Publication Data

US 2015/0131712 A1    May 14, 2015

Related U.S. Application Data

(63) Continuation of application No. 11/710,183, filed on Feb. 23, 2007, now Pat. No. 8,937,997.
(Continued)

(51) Int. Cl.
*H04N 19/30* (2014.01)
*H04N 21/2343* (2011.01)
(Continued)

(52) U.S. Cl.
CPC ........... *H04N 19/30* (2014.11); *H04N 19/132* (2014.11); *H04N 19/187* (2014.11);
(Continued)

(58) Field of Classification Search
None
See application file for complete search history.

(56) References Cited

U.S. PATENT DOCUMENTS

| 4,958,226 A | 9/1990 | Haskell et al. |
| 5,408,328 A | 4/1995 | Boliek et al. |

(Continued)

FOREIGN PATENT DOCUMENTS

| WO | 03063505 A | 7/2003 |
| WO | 2004068861 A1 | 8/2004 |
| WO | 2005055605 A | 6/2005 |

OTHER PUBLICATIONS

IEEE 100, The Authoritative Dictionary of IEEE Standards Terms, 7th ed., IEEE Press, Dec. 2000, pp. 1-11.
(Continued)

*Primary Examiner* — Jeffery L Williams
(74) *Attorney, Agent, or Firm* — Baker and Hostetler LLP

(57) ABSTRACT

Scalable video coding and multiplexing compatible with non-scalable decoders is disclosed. In some embodiments, video data is received and encoded in a manner that renders at least a base layer to be compatible with a non-scalable video encoding standard, including by assigning for at least the base layer default values to one or more scalability parameters. In some embodiments, video data is received and encoded to produce an encoded video data that includes a base layer that conforms to a non-scalable video encoding standard and one or more subordinate non-scalable layers, which subordinate non-scalable layers do not by themselves conform to the non-scalable video encoding standard but which can be combined with the base layer to produce a result that does conform to the non-scalable video encoding standard, such that the result can be decoded by a non-scalable decoder. An identification data identifying those portions of the encoded video data that are associated with a subordinate non-scalable layer is included in the encoded video data.

10 Claims, 3 Drawing Sheets

Related U.S. Application Data

(60) Provisional application No. 60/785,796, filed on Mar. 23, 2006, provisional application No. 60/782,807, filed on Mar. 16, 2006.

(51) Int. Cl.

| | | |
|---|---|---|
| *H04N 21/2389* | (2011.01) | |
| *H04N 21/2662* | (2011.01) | |
| *H04N 21/4385* | (2011.01) | |
| *H04N 21/647* | (2011.01) | |
| *H04N 21/658* | (2011.01) | |
| *H04N 21/845* | (2011.01) | |
| *H04N 19/46* | (2014.01) | |
| *H04N 19/196* | (2014.01) | |
| *H04N 19/61* | (2014.01) | |
| *H04N 19/132* | (2014.01) | |
| *H04N 19/187* | (2014.01) | |
| *H04N 19/33* | (2014.01) | |

(52) U.S. Cl.
CPC ........... *H04N 19/196* (2014.11); *H04N 19/33* (2014.11); *H04N 19/46* (2014.11); *H04N 19/61* (2014.11); *H04N 21/2389* (2013.01); *H04N 21/234327* (2013.01); *H04N 21/2662* (2013.01); *H04N 21/4385* (2013.01); *H04N 21/64792* (2013.01); *H04N 21/6582* (2013.01); *H04N 21/8451* (2013.01)

(56) References Cited

U.S. PATENT DOCUMENTS

| | | | |
|---|---|---|---|
| 5,414,469 A | 5/1995 | Gonzales et al. | |
| 5,465,119 A | 11/1995 | Demos | |
| 5,467,136 A | 11/1995 | Odaka et al. | |
| 5,488,418 A | 1/1996 | Mishima et al. | |
| 5,532,747 A | 7/1996 | Yoon et al. | |
| 5,539,468 A | 7/1996 | Suzuki et al. | |
| 5,612,735 A | 3/1997 | Haskell et al. | |
| 5,619,256 A | 4/1997 | Haskell et al. | |
| 5,633,684 A | 5/1997 | Teranishi et al. | |
| 5,699,117 A | 12/1997 | Uramoto et al. | |
| 5,757,971 A | 5/1998 | Kim | |
| 5,778,097 A | 7/1998 | Nickerson | |
| 5,786,855 A | 7/1998 | Chen et al. | |
| 5,825,421 A | 10/1998 | Tan | |
| 5,886,736 A | 3/1999 | Chen | |
| 5,978,509 A | 11/1999 | Nachtergaele et al. | |
| 5,999,189 A | 12/1999 | Kajiya et al. | |
| 6,005,623 A | 12/1999 | Takahashi et al. | |
| 6,005,980 A | 12/1999 | Eifrig et al. | |
| 6,026,183 A | 2/2000 | Talluri et al. | |
| 6,043,846 A | 3/2000 | Shen et al. | |
| 6,057,884 A | 5/2000 | Chen et al. | |
| 6,097,842 A | 8/2000 | Suzuki et al. | |
| 6,144,701 A | 11/2000 | Chiang et al. | |
| 6,148,026 A | 11/2000 | Puri et al. | |
| 6,330,280 B1 | 12/2001 | Suzuki et al. | |
| 6,404,813 B1 | 6/2002 | Haskell et al. | |
| 6,707,949 B2 | 3/2004 | Haskell et al. | |
| 6,771,703 B1 | 8/2004 | Oguz et al. | |
| 2004/0017853 A1 | 1/2004 | Garrido et al. | |
| 2005/0226322 A1 | 10/2005 | Van Der Vleuten et al. | |
| 2005/0254575 A1 | 11/2005 | Hannuksela | |
| 2007/0160126 A1 | 7/2007 | Van Der Meer et al. | |
| 2007/0201549 A1 | 8/2007 | Hannuksela et al. | |
| 2007/0211798 A1 | 9/2007 | Boyce et al. | |
| 2007/0286283 A1 | 12/2007 | Yin et al. | |
| 2009/0022230 A1 | 1/2009 | Kirenko | |
| 2011/0001642 A1 | 1/2011 | Yu et al. | |

OTHER PUBLICATIONS

"Scalable Video Coding—Joint Draft 4", Joint Video Team (JVT) of ISO/IEC MPEG & ITU-T VCEG (ISO/IEC JTC1/SC29/WG11 and ITU-T SG16 Q6), doc. No. JVT 0201, Oct. 31, 2005 (Oct. 31, 2005), pp. 1-137, XP002372100.

Miska M. Hannuksela et al.: "M12831 Comments on VM Study Text for Scalable Video Coding (SVC) File Format (N7586)" International Organisation for Standardisation ISO/IEC JTC1/SC29/WG11 Coding of Moving Pictures and Audio, Jan. 16, 2006 (Jan. 16, 2006), pp. 1-5, XP002446962 Bangkok, Thailand.

Wang et al.: "Scalability information SEI for SVC" Joint Video Team (JVT) of ISO/IEC MPEG & ITU-T VCEG (ISO/IEC JCT1/SC29/WG11 and ITU-T SG16 Q.6), [Online] Apr. 16, 2005 (Apr. 16, 2005), pp. 1-9, XP002446963 Busan, Korea Retrieved from the Internet: URL:http://ftp3.itu.ch/av-arch/jvt-site/2005_04_Busan/JVT-O012.doc>[retrieved on Aug. 15, 2007].

SCALABLE VIDEO CODING/MULTIPLEXING COMPATIBLE WITH NON-SCALABLE DECODERS

CROSS REFERENCE TO OTHER APPLICATIONS

This application is a continuation of U.S. patent application Ser. No. 11/710,183, filed Feb. 23, 2007, which claims priority to U.S. Provisional Patent Application No. 60/782,807entitled SCALABLE VIDEO CODING/MULTIPLEXING COMPATIBLE WITH NON-SCALABLE DECODERS filed Mar. 16, 2006, which is incorporated herein by reference for all purposes; and to U.S. Provisional Patent Application No. 60/785,796 entitled SCALABLE VIDEO CODING/MULTIPLEXING COMPATIBLE WITH NON-SCALABLE DECODERS filed Mar. 23, 2006, which is incorporated herein by reference for all purposes.

BACKGROUND OF THE INVENTION

In a scalable video coding/multiplexing scheme, it is desirable that the so-called base layer be compatible with a non-scalable video coding standard, e.g., H.264. It is also desirable that any multiplexing of additional scalable layers be carried out in such a way that non-scalable video decoders, which have no knowledge of scalability, will ignore all scalable layers and only decode the base layer.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
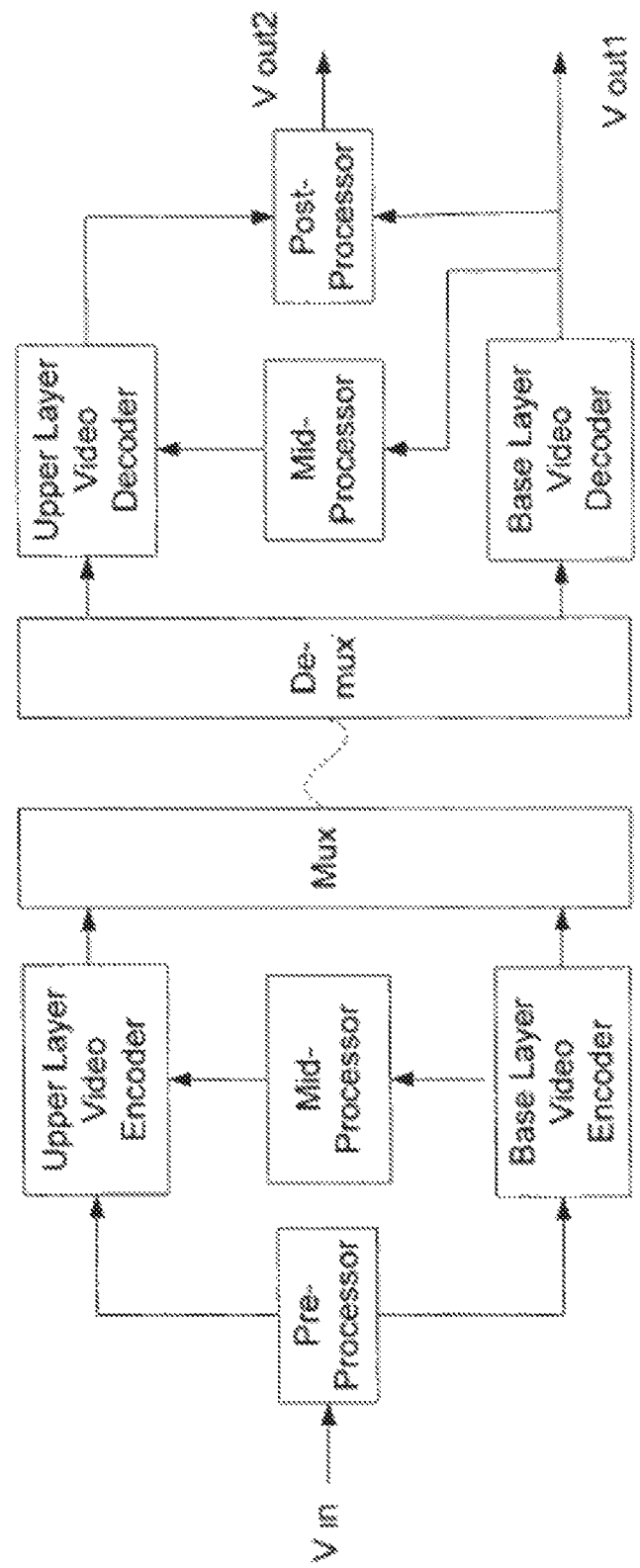
FIG. 1 is a block diagram illustrating an embodiment of a codec for scalable video coding.

FIG. 1 is a block diagram illustrating an embodiment of a codec for scalable video coding. In some embodiments, in a scalable video coding/multiplexing scheme the base layer is rendered compatible with a non-scalable video coding standard by assigning default values for the base layer to all necessary scalability parameters, e.g., priority id, dependency id, temporal level id, etc. For the base layer, a scalable decoder (e.g., the base layer decoder of FIG. 1) is configured to use for the base layer the default values for the scalability parameters, instead of transmitted scalability parameters, making it unnecessary to transmit scalability parameters for base layer data. By this means, the base layer can adhere in all ways to the non-scalable standard, and it is not necessary to transmit any scalability parameters in the base layer data. The base layer data may be used by a non-scalable decoder directly, without having to strip, filter out, discard, ignore, or otherwise not use without being confused by transmitted scalability parameter data.

Figure 2:
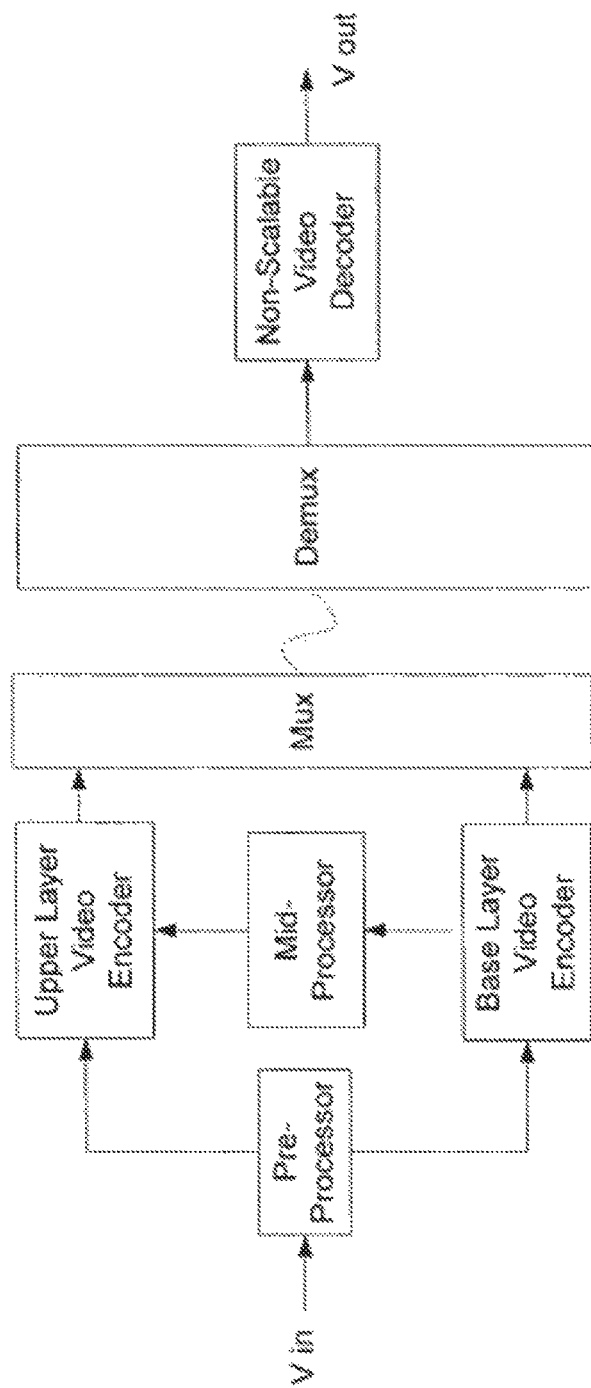
FIG. 2 is a block diagram illustrating an embodiment of a codec comprising a non-scalable video decoder configured to decode the base layer of a compatible scalable video stream.

FIG. 2 is a block diagram illustrating an embodiment of a codec comprising a non-scalable video decoder configured to decode the base layer of a compatible scalable video stream. In some embodiments, non-scalable video decoders, which have no knowledge of scalability, are enabled to ignore all scalable layers and only decode the base layer by tagging packets, called NAL units or NALUs in the H.264 video encoding standard, that are not associated with the base layer with values that non-scalable decoders know to discard. In some embodiments, non-scalable H.264 decoders, such as the non-scalable decoder of FIG. 2, are configured to decode only NALUs having nal_unit_type syntax element values defined in the non-scalable H.264 standard and to ignore (e.g., discard without decoding or attempting to decode) NALUs having nal_unit_type syntax element values not defined in the non-scalable H.264 standard.

Figure 3:
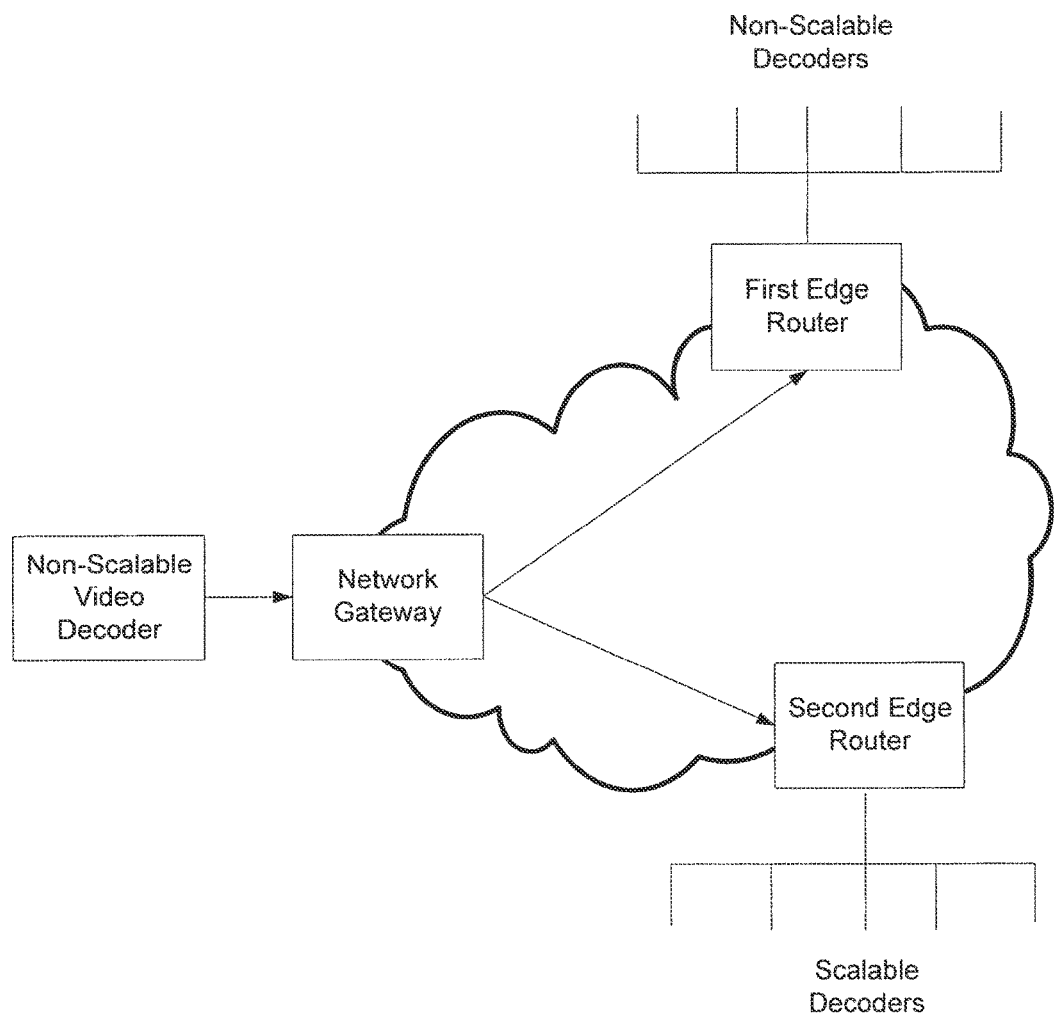
FIG. 3 is a block diagram illustrating an embodiment of a network gateway configured to route packets of video data based at least in part on whether a destination comprises a scalable or non-scalable decoder.

FIG. 3 is a block diagram illustrating an embodiment of a network gateway configured to route packets of video data based at least in part on whether a destination comprises a scalable or non-scalable decoder. In some embodiments, a network gateway or other network node, such as the network gateway of FIG. 3, is configured to route some NALUs to some destinations and other NALUs to other destinations. For example, if some destinations only contained non-scalable decoders (e.g., those associated with the first edge router of FIG. 3), then in some embodiments the gateway or other node would route to them only NALUs having nal_unit_type syntax element values defined in the non-scalable H.264 standard. Using this approach, network resources and/or bandwidth are not used to send to non-scalable decoders NALUs n usable by such decoders.

In some scalable video streams there may be more than one layer that conforms to the non-scalable standard, and in such cases it is desirable to identify such layers to decoders and/or gateways.

Thus, in some embodiments, different default scalability parameters are assigned to each non-scalable layer according to certain characteristics of that non-scalable layer. For example, in H.264 the default scalability parameters could depend on the sequence parameter set or picture parameter set of the non-scalable layer. This enables the scalable decoder to utilize any of the non-scalable layers as its base layer.

In some embodiments, a special NALU is inserted just before some or all of the non-scalable video NALUs. This special NALU indicates that the following NALU belongs to a layer in the scalable hierarchy, but that it's coding is compatible with the non-scalable standard. This special NALU could also contain scalability data pertaining to the following compatible NALU, e.g., priority id, dependency id, temporal level id, etc.

A non-scalable video decoder would ignore the special NALU and select one of the available non-scalable layers to decode and display. For example, the selection could be on the basis of profile and level of the non-scalable layers, or picture size. Or it could be by some other selection mechanism contained, for example, in a file format such as mp4. A gateway could use data in the special NALU to make routing decisions, or it could use mechanisms similar to those above that a decoder would use.

In some embodiments, the video data conforming to the non-scalable standard is contained in scalable NALUs, but in a form that is easily extractable for use by a non-scalable decoder. For example, in some embodiments the scalability data is contained in the front of the scalable NALUs. A gateway or preprocessor strips off the scalability data, changes the nal_unit_type syntax element value to a non-scalable value, and sends the result to one or more non-scalable decoders.

In sortie embodiments, the video data conforming to the non-scalable standard is contained in scalable NALUs having special nal_unit_type syntax element values or other syntax element values that identify the video data as being coded in a non-scalable form. In various embodiments, scalability data is contained in the front of these NALUs or in another prescribed location in the NALUs. A gateway or preprocessor strips off the scalability data, changes the nal_unit_type syntax element to a non-scalable value, and sends the result to one or more non-scalable decoders.

In some scalable video streams there may be some layers that, by themselves, do not conform to the non-scalable standard, but when combined with other layers do conform. For purposes of clarity we call these layers subordinate non-scalable layers. For example, with temporal scalability the base layer may conform to the non-scalable standard, but the subordinate non-scalable layers, by themselves, do not. However, when the subordinate non-scalable layers are combined correctly with the base layer, the overall result does conform to the non-scalable standard and can be decoded by non-scalable decoders.

In some embodiments, the subordinate non-scalable layers are labeled so that they can be easily identified by scalable decoders, preprocessors and/or gateways. In some embodiments, this is done by inserting a special NALU before the subordinate non-scalable layer NALUs. These special NALUs have nal_unit_type syntax element values or other syntax element values that identify the subordinate non-scalable layers. The subordinate non-scalable layer NALUs have nal_unit_type syntax element values conforming to the non-scalable standard. A gateway may then use data in the special NALUs to make its routing decisions. It may send only the base layer to some non-scalable decoders, the base layer plus some or all subordinate non-scalable layers to other non-scalable decoders, and some or all layers to scalable decoders.

In some embodiments, the video data of the subordinate non-scalable layers is contained in scalable NALUs, but in a form that is easily extractable for use by a non-scalable decoder. For example, in some embodiments the scalability data is contained in the front of the scalable NALUs. A gateway or preprocessor strips off the scalability data, changes the nal_unit_type syntax element value to a non-scalable value, and sends the result to non-scalable decoders.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A video encoding system, comprising:
a network communication interface device configured to receive a video data; and
a video encoder device coupled to the network communication interface device and configured to encode the video data to produce a composite data stream that includes a base layer data stream that conforms to a non-scalable video encoding standard and a subordinate non-scalable layer data stream, which subordinate non-scalable layers does not by itself conform to the non-scalable video encoding standard but which, when integrated with the base layer data stream produces the composite data stream that conforms to the non-scalable video encoding standard; and include in the composite data stream identification data identifying portions of the composite data stream that are associated with a subordinate non-scalable layer data stream.

2. A system as recited in claim 1, wherein the identification data comprises a special NAL unit inserted before a NAL unit associated with the subordinate non-scalable layer data stream.

3. A system as recited in claim 2, wherein the NAL unit associated with the subordinate non-scalable layer data stream has a nal_unit_type syntax element value that conforms to the non-scalable video encoding standard.

4. A system as recited in claim 2, wherein the NAL unit associated with the subordinate non-scalable layer data stream comprises a scalable NAL unit containing the video data of the subordinate non-scalable layer data stream.

5. A computer readable non-transitory medium comprising instructions, that when executed by a processor, cause:
receiving a video data;
encoding the video data to produce a composite data stream that includes a base layer data stream that conforms to a non-scalable video encoding standard and a subordinate non-scalable layer data stream, which subordinate non-scalable layer data stream does not by itself conform to the non-scalable video encoding standard but which, when integrated with the base layer data stream, produces the composite data stream that conforms to the non-scalable video encoding standard; and
including in the composite data stream identification data identifying portions of the composite data stream that are associated with the subordinate non-scalable layer.

6. A computer program product as recited in claim 5, wherein the identification data comprises a special NAL unit inserted before a NAL unit associated with the subordinate non-scalable layer data stream.

7. A computer program product as recited in claim 6, wherein the NAL unit associated with the subordinate non-scalable layer data stream has a nal_unit_type syntax element value that conforms to the non-scalable video encoding standard.

8. A computer program product as recited in claim 6, wherein the NAL unit associated with the subordinate non-scalable layer data stream comprises a scalable NAL unit containing the video data of the subordinate non-scalable layer data stream.

9. A video decoding system, comprising:
a network communication interface device configured to receive a composite data stream that includes
  (1) a base layer data stream that conforms to a non-scalable video encoding standard and a subordinate non-scalable layer data stream, which subordinate non-scalable layer data stream does not by itself conform to the non-scalable video encoding standard but which, when combined with the base layer data stream produces the composite data stream that conforms to the non-scalable video encoding standard; and
  (2) identification data identifying portions of the composite data stream that are associated with the subordinate non-scalable layer data stream; and
a video decoder device coupled to the network communication interface device and configured to decode the composite data stream, including using the identification data to combine with the base layer data stream the said portions of the composite data stream that are associated with the subordinate non-scalable layer data stream.

10. A computer readable non-transitory medium comprising instructions, that when executed by a processor, cause:
receiving a composite data stream that includes
  (1) a base layer data stream that conforms to a non-scalable video encoding standard and a subordinate non-scalable layer data stream, which subordinate non-scalable layer data stream does not by itself conform to the non-scalable video encoding standard but which, when integrated with the base layer data stream, produces the composite data stream that conforms to the non-scalable video encoding standard; and
  (2) identification data identifying portions of the composite data stream that are associated with the subordinate non-scalable layer data stream; and
decoding the composite data stream, including by using the identification data to integrate with the base layer data stream one or more of said portions of the composite data stream that are associated with a subordinate non-scalable layer data stream.

* * * * *